United States Patent
Kitazoe et al.

(10) Patent No.: US 8,208,498 B2
(45) Date of Patent: Jun. 26, 2012

(54) METHODS AND SYSTEMS FOR HFN HANDLING AT INTER-BASE STATION HANDOVER IN MOBILE COMMUNICATION NETWORKS

(75) Inventors: Masato Kitazoe, Hachiouji (JP); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 677 days.

(21) Appl. No.: 12/259,825

(22) Filed: Oct. 28, 2008

(65) Prior Publication Data

US 2009/0122762 A1 May 14, 2009

Related U.S. Application Data (60) Provisional application No. 60/983,838, filed on Oct. 30, 2007.

(51) Int. Cl.
*G01R 31/08* (2006.01)
*H04J 3/06* (2006.01)
*H04W 36/00* (2009.01)

(52) U.S. Cl. ........ 370/509; 370/235; 370/252; 370/503; 455/439; 455/442

(58) Field of Classification Search .................. 370/230, 370/235, 252, 254, 328, 503, 507, 509; 455/436, 455/439, 442
See application file for complete search history.

(56) References Cited

U.S. PATENT DOCUMENTS

| | | | | |
|---|---|---|---|---|
| 2003/0157927 A1* | 8/2003 | Yi et al. | ........................ | 455/411 |
| 2004/0042491 A1* | 3/2004 | Sarkkinen et al. | ............ | 370/469 |
| 2006/0050679 A1* | 3/2006 | Jiang | .............................. | 370/350 |
| 2007/0258591 A1* | 11/2007 | Terry et al. | ..................... | 380/247 |
| 2008/0240439 A1* | 10/2008 | Mukherjee et al. | ........... | 380/272 |

FOREIGN PATENT DOCUMENTS

| | | |
|---|---|---|
| EP | 1276279 A1 | 1/2003 |
| EP | 1337125 A2 | 8/2003 |
| KR | 20030068741 A | 8/2003 |
| WO | WO03069806 A1 | 8/2003 |
| WO | WO2006130354 | 12/2006 |

OTHER PUBLICATIONS

International Search Report & Written Opinion—PCT/US2008/081639, International Search Authority—European Patent Office—Feb. 16, 2009.

Ericsson, "Key and sequence number handling at mobility," R2-074096, 3GPP TSG-RAN WG2 #59bis, Oct. 8-12, 2007, Shanghai, China, pp. 1-4.

Qualcomm Europe, "PDCP deciphering window," R2-073439, 3GPP TSG-RAN WG2 meeting #59, Aug. 20-24, 2007, Athens, Greece, pp. 1-2.

(Continued)

*Primary Examiner* — Kwang B Yao
*Assistant Examiner* — Redentor Pasia
(74) *Attorney, Agent, or Firm* — Steven A. Raney (57) ABSTRACT

Systems and methods for addressing the de-synchronization of the cryptosync between the network and the mobile stations (eNB) that can occur at mobility are addressed. De-synchronization is resolved by forwarding HFN and PDCP Sequence Number(s) from the source eNB to the target eNB. In order to avoid re-use of a cryptosync for a given key, a backward offset from the initial COUNT value is used by the target eNB. These approaches do not require an over-the-air signaling and the COUNT value handling in the network is transparent to the mobile station.

37 Claims, 7 Drawing Sheets

OTHER PUBLICATIONS

Qualcomm Europe, "PDCP deciphering window," R2-074258, 3GPP TSG-RAN WG2 #59bis, Oct. 8-12, 2007, Shanghai, China, pp. 1-3.

Samsung, "HFN delivery function?," R2-073385, 3GPP TSG-RAN2 Meeting #59, Aug. 20-24, 2007, Athene, Greece, pp. 1-3.

* cited by examiner

METHODS AND SYSTEMS FOR HFN HANDLING AT INTER-BASE STATION HANDOVER IN MOBILE COMMUNICATION NETWORKS

RELATED APPLICATIONS

The present patent application claims priority to Provisional Patent Application No. 60/983,838, titled "HFN Handling at Inter-base Station Handover," filed Oct. 30, 2007, which is assigned to the assignee hereof and filed by the inventors hereof and which is incorporated by reference herein.

FIELD

This disclosure relates generally to encryption integrity of wireless communications, and more particularly to Hyper-frame Number (HFN) related handling during handoff between base stations in mobile systems.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

The present disclosure is directed to systems and methods for managing encryption/decryption parameters during handoff between base stations in a mobile system, and variations thereof.

In one of various aspects of the disclosure, a method used for Hyper-frame Number (HFN) related synchronization between base stations during handoff in a wireless communication system is provided, the method comprising: transferring at least a latest ciphering HFN and packet data convergence protocol (PDCP) sequence number (SN) and latest deciphering HFN and PDCP sequence number from a source base station to a target base station; and transferring a next PDCP sequence number to use from the source base station to the target base station, wherein the transferred information enables the target base station to provide substantial continuity of the HFN and PDCP sequence number(s) for a terminal being handed off from the source base station if information of a later HFN and PDCP sequence number of the last HFN and PDCP sequence number sent by the source base station is not received by the target base station.

In one of various aspects of the disclosure, the method disclosed above is provided, further comprising performing a count maintenance based upon at least the latest ciphering HFN and PDCP and latest deciphering HFN and PDCP by using a backward offset from a count value used by the target base station.

In one of various aspects of the disclosure, an apparatus for Hyper-frame Number (HFN) related synchronization between base stations during handoff in a wireless communication system is provided, comprising: a source base station; a target base station; a communication link between the source base station and the target base station; and a terminal being handed off from the source base station to the target base station, wherein the source base station transfers via the communication link at least a latest ciphering HFN and packet data convergence protocol (PDCP) sequence number (SN) and latest deciphering HFN and PDCP sequence number to the target base station, and transfers via the communication link a next PDCP SN to use to the target base station, wherein the transferred information enables the target base station to provide substantial continuity of the HFN and PDCP sequence number(s) for a terminal being handed off from the source base station if information of a later HFN and PDCP sequence number of the last HFN and PDCP sequence number sent by the source base station is not received by the target base station.

In one of various aspects of the disclosure, the apparatus disclosed above is provided, wherein a count maintenance is performed based upon at least the latest ciphering HFN and PDCP and latest deciphering HFN and PDCP by using a backward offset from a count value used by the target base station.

In one of various aspects of the disclosure, an apparatus used for Hyper-Frame Number (HFN) related synchronization between base stations during handoff in a wireless communication system is provided, the apparatus comprising: a processor configured for transferring at least a latest ciphering HFN and packet data convergence protocol (PDCP) sequence number (SN) and latest deciphering HFN and PDCP sequence number from a source base station to a target base station; transferring a next PDCP SN to use from the source base station to the target base station, wherein the transferred information enables the target base station to provide substantial continuity of the HFN and PDCP sequence number(s) for a terminal being handed off from the source base station if information of a later HFN and PDCP sequence number of the last HFN and PDCP sequence number sent by the source base station is not received by the target base station; and a memory coupled to the processors for storing data.

In one of various aspects of the disclosure, the apparatus described above is provided, wherein the processor is further configured for performing a count maintenance based upon at least the latest ciphering HFN and PDCP and latest deciphering HFN and PDCP by using a backward offset from a count value used by the target base station.

In one of various aspects of the disclosure, an apparatus used for Hyper-Frame Number (HFN) related synchronization between base stations during handoff in a wireless communication system is provided, the apparatus comprising: means for transferring at least a latest ciphering HFN and packet data convergence protocol (PDCP) sequence number (SN) and latest deciphering HFN and PDCP sequence number from a source base station to a target base station; means for transferring a next PDCP SN to use from the source base station to the target base station, wherein the transferred information enables the target base station to provide substantial continuity of the HFN and PDCP sequence number(s) for a terminal being handed off from the source base station if information of a later HFN and PDCP sequence number of the last HFN and PDCP sequence number sent by the source base station is not received by the target base station.

In one of various aspects of the disclosure, a computer program product is provided comprising: a computer-readable medium comprising: code for transferring at least a latest ciphering Hyper-Frame Number (HFN) and packet data convergence protocol (PDCP) sequence number and latest deciphering HFN and PDCP sequence number from a source base station to a target base station; and code for transferring a next PDCP SN to use from the source base station to the target base station, wherein the transferred information enables the target base station to provide substantial continuity of the HFN and PDCP sequence number(s) for a terminal being handed off from the source base station if information of a later HFN and PDCP sequence number of the last HFN and PDCP sequence number sent by the source base station is not received by the target base station.

In one of various aspects of the disclosure, the computer program product described above is provided, further comprising code for performing a count maintenance based upon at least the latest ciphering HFN and PDCP and latest deciphering HFN and PDCP by using a backward offset from a count value used by the target base station.

DETAILED DESCRIPTION

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to or utilizing a wireless modem. Moreover, various embodiments are described herein in connection with a base station. A base station can be utilized for communicating with access terminal(s) and can also be referred to as an access point, Node B, eNode B (eNB), or some other terminology. Depending on the context of the descriptions provided below, the term Node B may be replaced with eNB and/or vice versus as according to the relevant communication system being employed.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc.

The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a communication technique. SC-FDMA has similar performance and essentially the same overall complexity as those of OFDMA systems. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
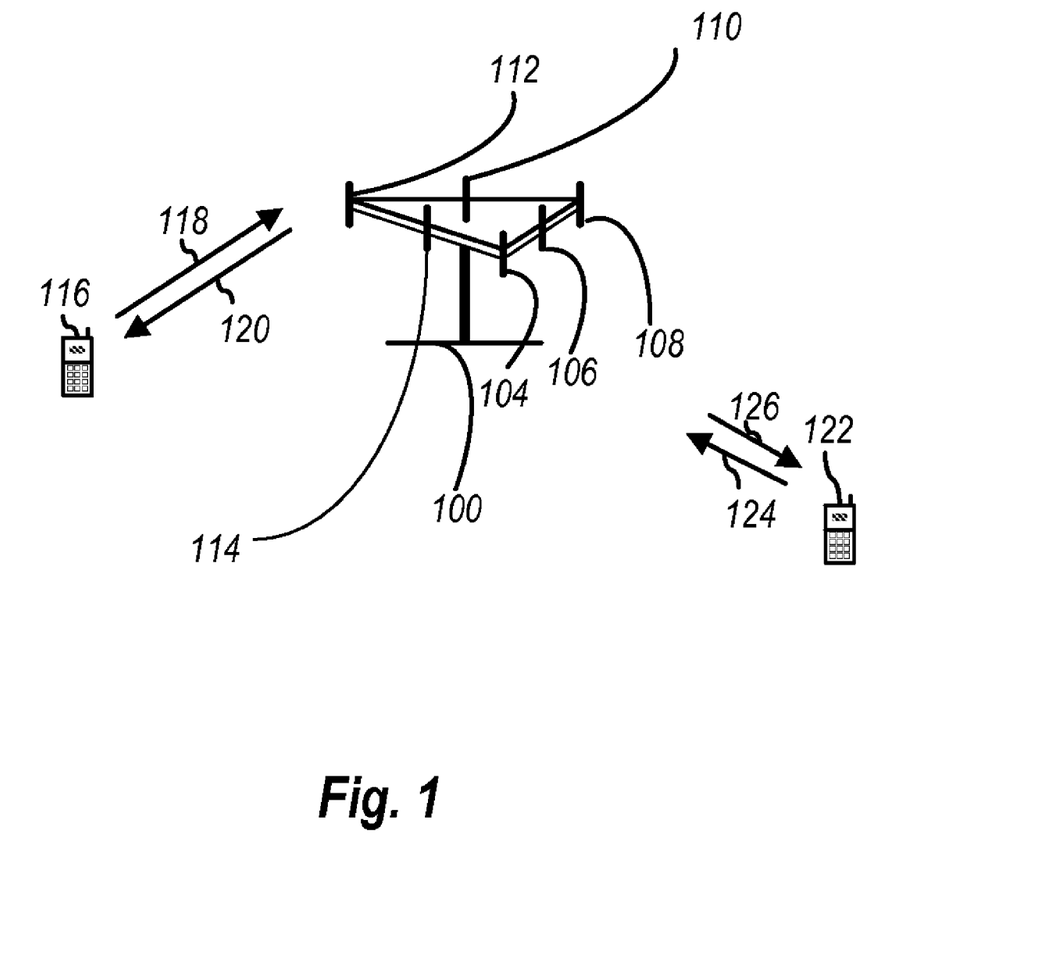
FIG. 1 illustrates a multiple access wireless communication system according to one embodiment.

Referring to FIG. 1, a multiple access wireless communication system according to one embodiment is illustrated. An access point 100 (AP), also referred to as e-NodeB or eNB, includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT), also referred to as user equipment (UE), is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
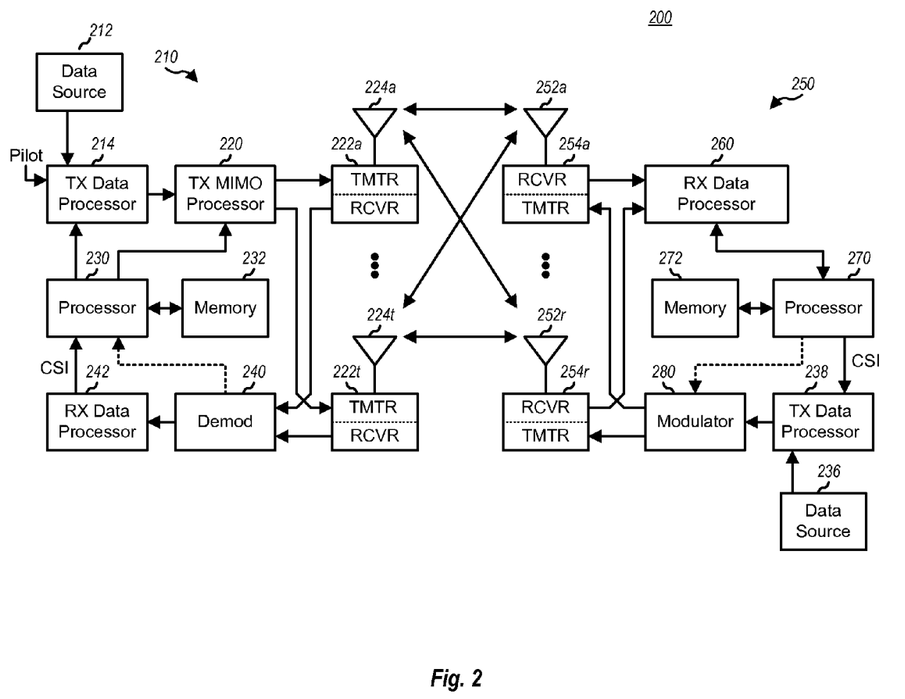
FIG. 2 a block diagram of a communication system.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. Memory 232 may be coupled to the processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222a-t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252a-r is provided to a respective receiver (RCVR) 254a through 254r. Each receiver 254a-r conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254a-r based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion. Memory 272 may be coupled to the processor 270.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224a-t, conditioned by receivers 222a-t, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In an aspect, Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprises a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

Figure 3:
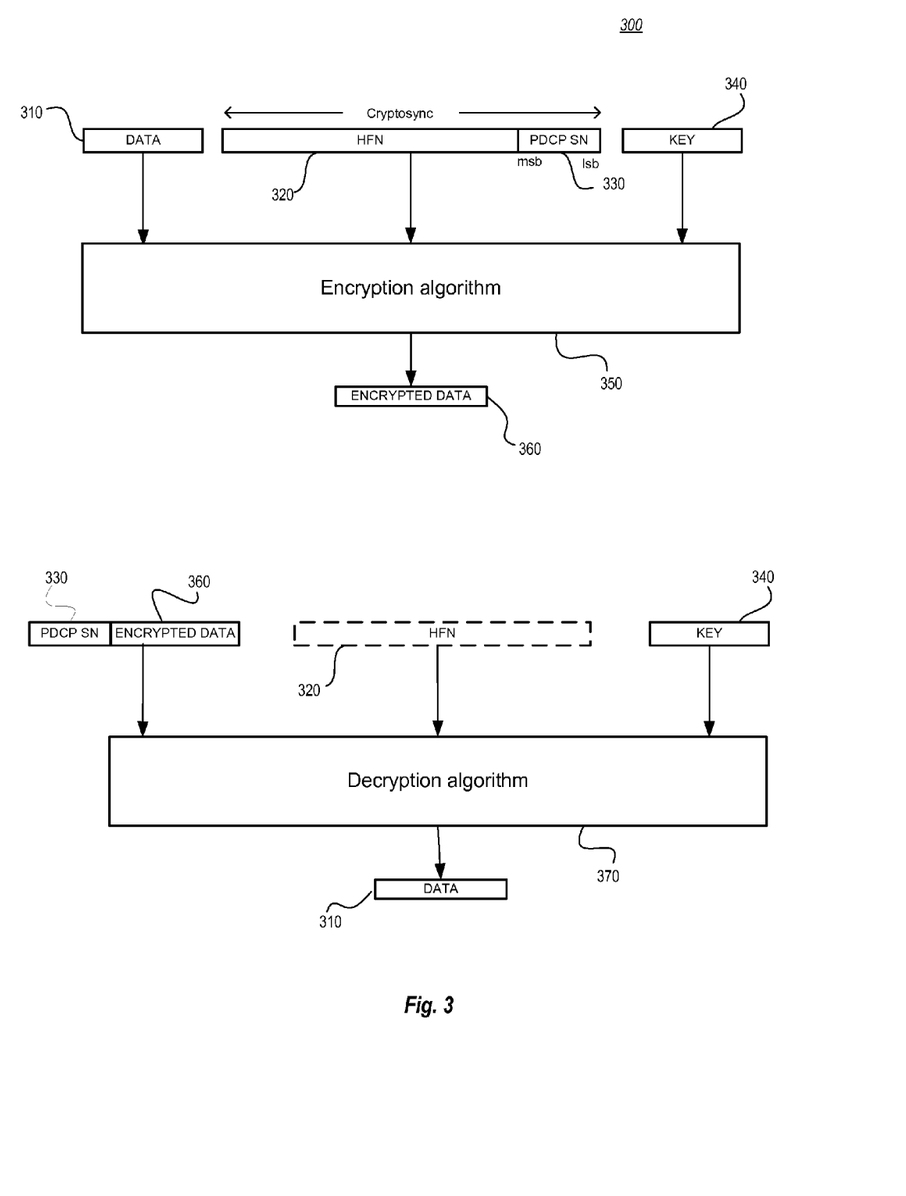
FIG. 3 is a block diagram of an encryption and decryption scheme for a mobile system.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel
eNB Base station or base transceiver station
PDCP Packet Data Convergence Protocol
HFN Hyper Frame Number FIG. 3 is a block diagram 300 illustrating an encryption and decryption scheme suitable for use in a mobile system. The upper diagram illustrates the general tenets of the encryption procedure at the eNB. Here, data 310 is combined with a cryptosync expression containing HFN 320 and packet data convergence protocol (PDCP) layer sequence number (SN) 330, and coded with cipher key 340 using the encryption algorithm 350, to generate the encrypted data 360 which is forwarded to the UE.

The lower diagram illustrates the general decryption procedure at the UE. Here, the received encrypted data 360 is combined with the PDCP SN 330 and HFN 320 (which may be acquired or generated at the UE at initialization/setup), and decoded using the cipher key 340 (sometimes called the integrity key) and the decryption algorithm 370 to recreate the original data 310. FIG. 3 is understood to provide a general summary of the use of the HFN 320 and PDCP SN 330 for encryption/decryption. Additional factors or elements regarding encryption/decryption are not further elaborated as they are not relevant for the purposes of understanding the various embodiments disclosed herein.

It is understood in cryptology that an increased level of security can be arrived by combining the data with a large set to increase the number of possible combinations. In the mobile community, this large set is referred to as the cryptosync which, having the HFN and PDCP SN, can be sequentially ordered by incrementing the value of the PDCP SN. This incrementing provides an order or sequencing for the HFN/PDCP SN values to ensure that the cryptosync will change for each set of encrypted/decrypted packets. Because the cryptosync can represent a large value, and because this value is changing (via PDCP SN sequencing), a certain degree of randomness is introduced resulting in a more robust encryption scheme. However, this robustness presumes that the same HFN/PDCP SN sequence will not be used more than once for a given key. This is because encryption methods using repetitive "coding elements" are known to be more susceptible to being cracked.

Figure 4:
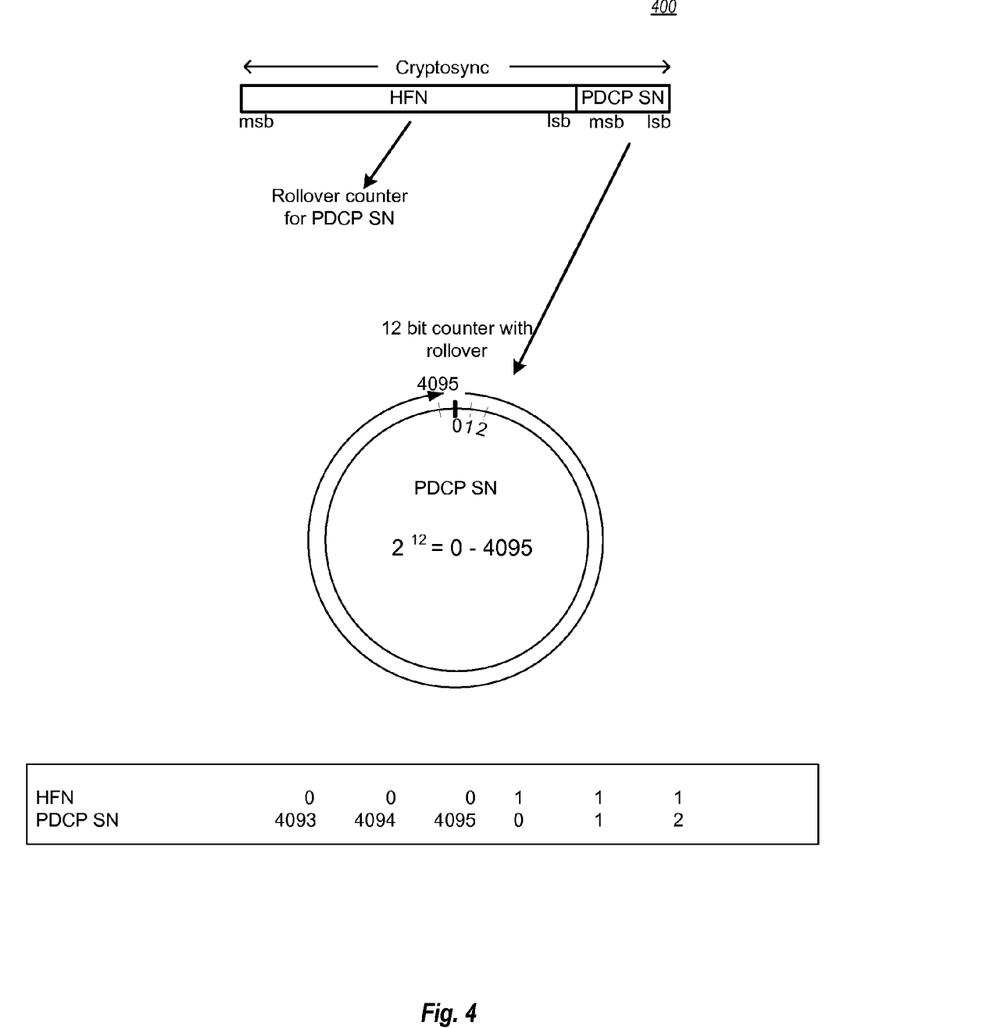
FIG. 4 is an illustration of the HFN to PDCP SN relationship.

FIG. 4 is an illustration 400 showing the HFN to PDCP SN relationship. The PDCP SN is a fixed bit counter, shown in FIG. 4 as a 12 bit counter. It should be noted, that in various implementations, the PDCP SN may be a 5, 7, or 12 bit counter or other-sized counter and therefore the PDCP SN is not limited to the 12 bit implementation shown here. The PDCP SN operates as a circular counter that "resets" itself and rolls over to its previous starting value. For example, the PDCP SN (using 12 bits) has a decimal range of 1 to 4096 (or from 0 to 4095). Using the range 0 to 4095, the value 4096 is equivalent to 0, with the value 4097 being equivalent to 1, 4098 being equivalent to 2, and so forth. Accordingly, PDCP SN values of 1 are equivalent to rollover values of 4097, 8193, 12,289, etc. To keep track of the number of "rollovers" of the PDCP SN, the HFN can be used as a counter. Thus, if the PDCP SN has rolled over 4 times, the HFN will show a value of 4 in the right hand side (the HFN may, in some instances, reserve the upper bits for other information). As is apparent, there can be an exceedingly large number of values that can be obtained by the HFN/PDCP SN combination.

As shown in FIG. 3, the decryption algorithm 370 requires that the PDCP SN and HFN values are the same values used in the encryption algorithm 360. Therefore, it is important that the decrypting entity (receiving terminal) correctly obtains the same PDCP SN and HFN value(s) used in the encrypting entity (transmitting station). During handoff between two transmitting stations, there is the possibility that the target transmitting station may not receive the correct sequence PDCP SN/HFN values from the source transmitting station. To avoid this, it has been proposed that the HFN used by the target transmitter is reset to zero at handover, with the PDCP sequence preserved, requiring a key change at handover. However, this approach introduces the possibility that the HFN values may be "prematurely" reset. That is, the full range of the HFN values may not be fully utilized before being reset to zero at handoff, thus essentially defeating the "large" cryptosync contribution to the ciphering algorithm. What would be desirable would be a scheme that utilizes a larger range of the HFN/PDCP SN values and avoids ambiguities from the rollover of the PDCP SN.

Figure 5:
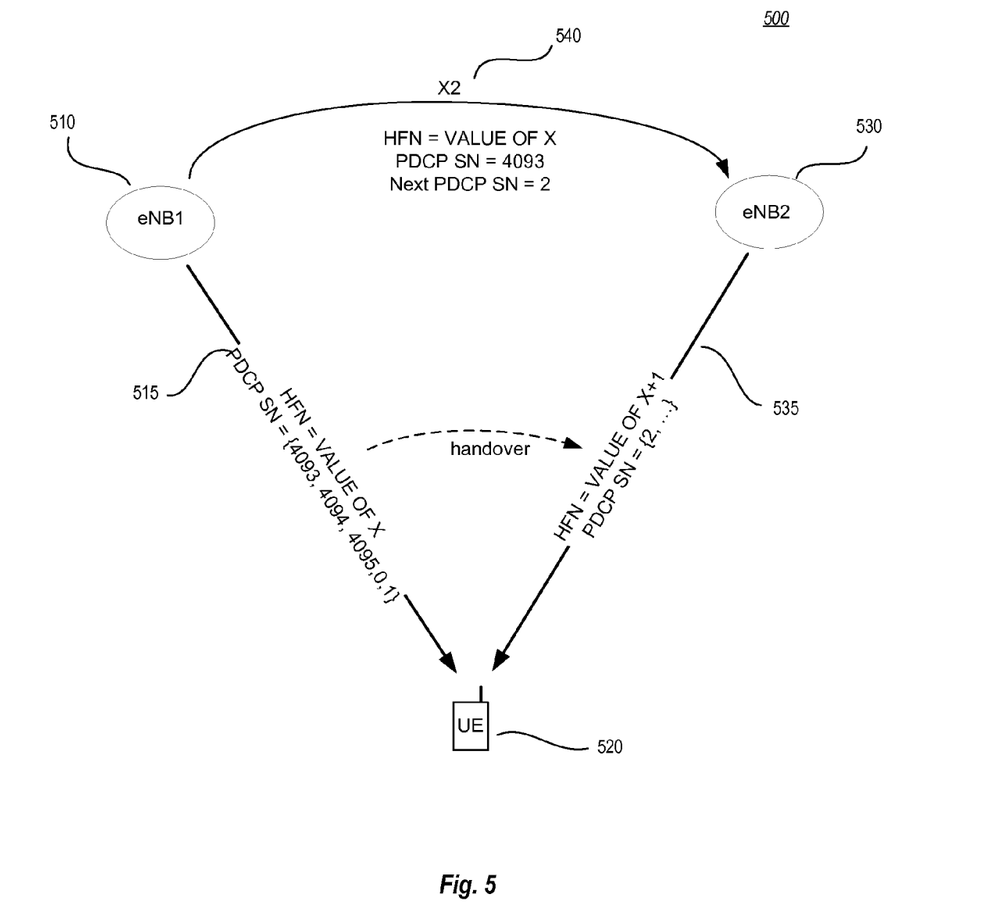
FIG. 5 is an illustration of handoff parameters between two eNBs.

FIG. 5 is an illustration 500 of handoff parameters between two eNBs according to an exemplary approach where the HFN is also kept at the mobility. In this embodiment, the HFN does not need to be reset (and therefore, the key does not have to be changed at handover). When a source transmitter 510 is sending encrypted data via link 515 and the receiver 520 (UE) is being handoff to target transmitter 530, the "next PDCP SN to use" and the following are transferred from the source eNB 510 to the target eNB 530 via communication line X2 (540):

The latest HFN and PDCP SN used for ciphering in the source eNB 510

The latest HFN and PDCP SN used for deciphering in the source eNB 510

For DL ciphering, the target eNB 530 may perform the normal COUNT maintenance for ciphering based on the SN of the PDCP SDU to be transmitted and the transferred latest HFN and PDCP SN for ciphering. The term COUNT may represent the aggregate of the HFN and PDCP SN. The following shows an example for DL ciphering according to an exemplary embodiment as illustrated in FIG. 5:

Source eNB 510 is using HFN value=x with PDCP SN value=4093 for ciphering before handover. This combination can be symbolized by the expression x∥4093. During handover, the source eNB 510 transfers the current HFN value=x and the current PDCP SN value 4093 (i.e., x∥4093) to the target eNB 530 and transfers "Next PDCP SN to use=2" also to the target eNB 530. Source eNB 530 also transfers PDCP PDUs with SNs 4094, 4095, 0, 1 to the target eNB 530.

At handover, the target eNB 530 then sends to the UE 520 the following: x∥4094, x∥4095, (x+1)∥0 (COUNT maintenance requires increment of HFN), (x+1)∥1, and (x+1)∥2.

Having received the starting PDCP SN value=4093 and the next PDCP SN to use=2 from the source eNB 510, even if PDCP SN=4094 and PDCP SN=4095 were lost in the data link X2 (540) to the target eNB 530, the target eNB 530 would still know when to increment HFN since it knows the last PDCP SN reported by the source eNB 510 was 4093. Accordingly, as seen in link 535, the target eNB 530 can forward the correct sequence of ciphering/deciphering HFN/PDCP SN values to the UE 520.

Therefore, the need to force a reset of the HFN and/or PDCP SN values at handoff due to the possibility that the source and target eNBs may be out of sync during the handoff, can be obviated. Further, by this scheme, a greater range of the HFN and/or PDCP SN values can be utilized.

Based on the above description, the UL deciphering procedure would follow analogously, with appropriate accommodations. Since this is within the purview of one of ordinary skill in the art, the details of the UL procedure is not elaborated as being generally redundant.

Figure 6A:
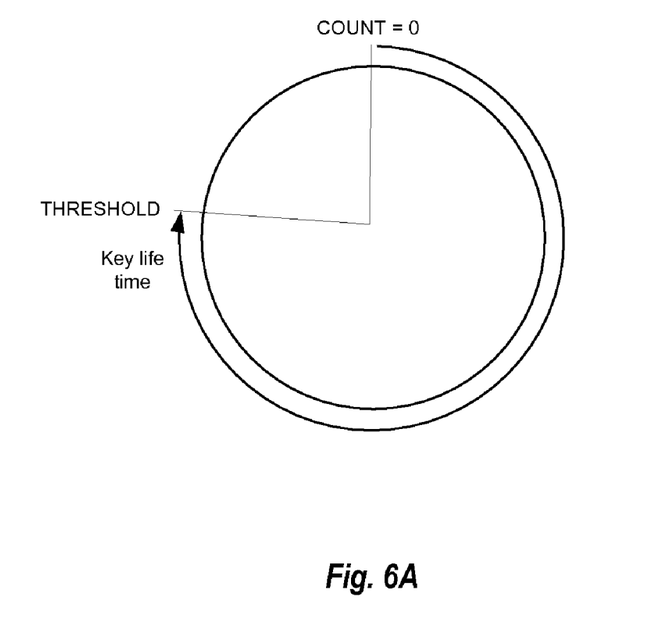
FIGS. 6A-B are illustrations of offset schemes for HFN/PDCP SN control.
Figure 6B:
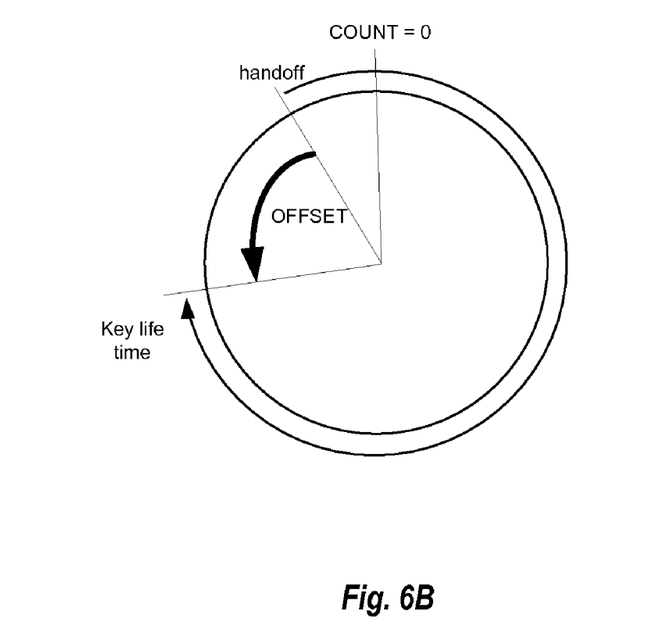

FIGS. 6A-B are illustrations of offset schemes for HFN/PDCP SN control. If a UE is only communicating with a base station for a long period of time, then it is possible that the HFN/PDCP SN combination may run full cycle. That is, the cryptosync (or referred to in some instances as COUNT) may overflow and start at zero. Or that a particular implementation may force a reset to zero. To avoid reusing the COUNT=0 value, in typical systems, a THRESHOLD value can be used upon which the key is changed when COUNT reaches or exceeds the THRESHOLD. This scenario is illustrated in FIG. 6A.

However, as described the above exemplary embodiment(s), the need for a THRESHOLD trigger is less evident once we assume HFN is kept at inter-eNB handover. Specifically, the wraparound of COUNT does not necessarily mean the expiration of the key life time. This is because the eNB key is changed at inter-eNB handover and the COUNT value starts from an arbitrary value.

FIG. 6B illustrates an exemplary approach based on the above description. Presuming a first key or new key has been generated either at initialization or first handoff, the COUNT value can continue with the next or next-provided sequence (according to the embodiment(s) described above) and increment past the COUNT=0 value and continue thereon. At some triggering value before the handoff value, designated by a backwards OFFSET from the handoff point (or forward OFFSET, depending on implementation preference) the key will expire and a new key will be generated. The OFFSET may be dependent on some network parameter, if desired.

It is understood that the network may apply a backwards offset from the initial COUNT value as shown in FIG. 6B. It should be noted that the above key life time handling is necessary per radio bearer using RLC-AM in the network, and may find applicability in E-UTRAN. The exemplary handling of COUNT does not require standardization and can be completely transparent to the UE. The UE specification should allow the wraparound of COUNT value, but the UE does not have to be aware of the possible COUNT value reuse. It can be up to the network to take appropriate action (i.e. re-keying) in order to avoid the reuse of COUNT value for the same key. This approach provides the following advantages:

Does not require a standardization of the network behaviour

No over the air signalling

Key life time maintenance is completely transparent to the UE

It should be noted that this solution may require following some network internal actions or modifications thereto. However, the exemplary methods and systems disclosed herein demonstrate advantages that believed to justify altering the network complexity.

Figure 7:
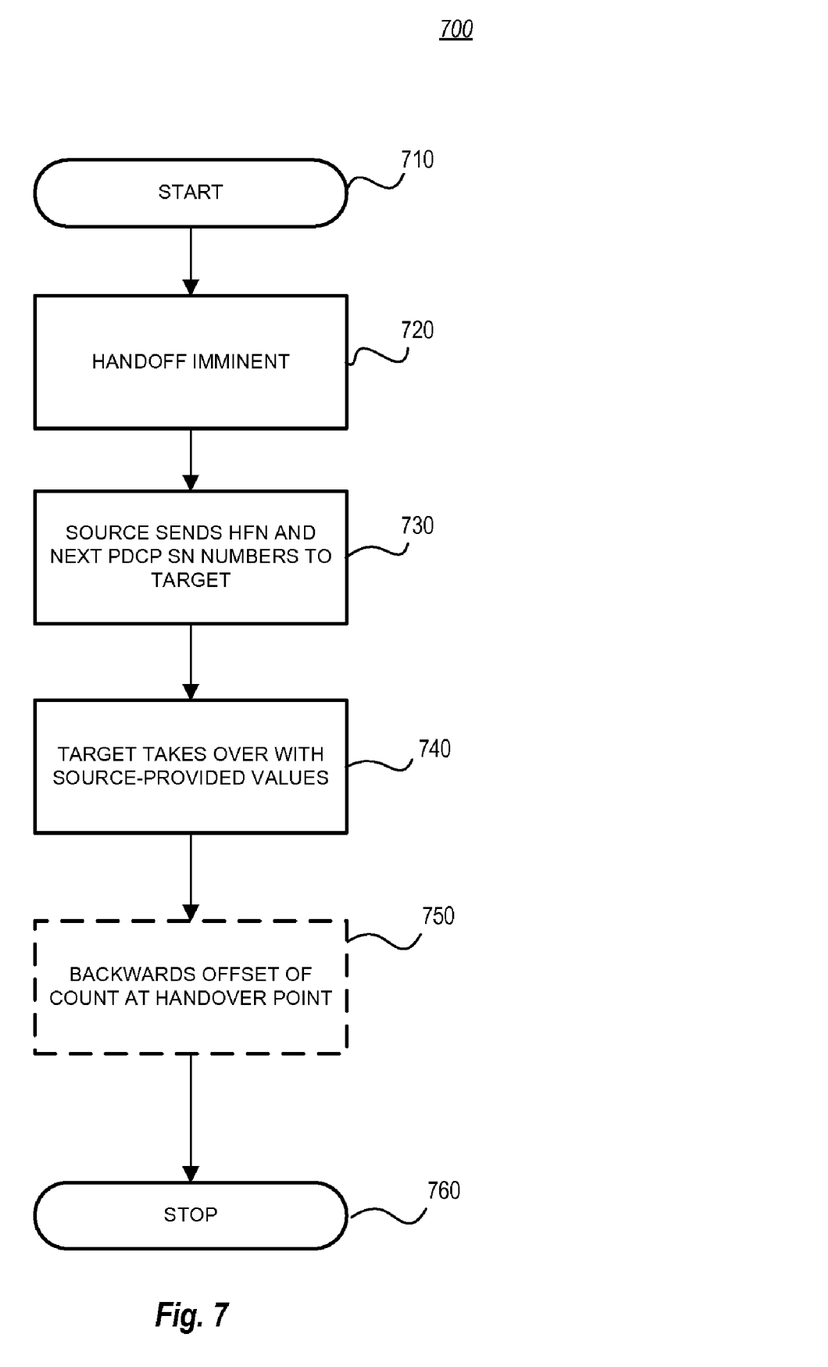
FIG. 7 is a flow chart illustrating an exemplary process.

FIG. 7 is a flow chart illustrating an exemplary process 700 according an embodiment of this disclosure. After initiation 710, the exemplary process 700 begins with some notification that a handoff is imminent 720. Prior to handoff, the source station sends the requisite HFN and next PDCP SN numbers to the target station 730. The target station, having received the appropriate information takes over control of deciphering/ciphering for the UE—step 740. After handoff, the exemplary process 700 may optionally initiate a backwards offset to the COUNT 750 according to the scheme(s) described in FIG. 6. Upon completion of step 740 or optional step 750, the exemplary process terminates 760.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill would further appreciate that the various illustrative logical blocks, modules, circuits, and algorithm steps described in connection with the embodiments disclosed herein may be implemented as electronic hardware, computer software, including a computer program in the form of a computer-readable medium, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method used for synchronization between base stations during handoff in a Long Term Evolution (LTE) wireless communication system, the method comprising:
generating a message comprising a plurality of sequential counts and a next packet data convergence protocol (PDCP) sequence number (SN) for handover continuity, each count comprising an aggregate of a Hyper-Frame Number (HFN) and a PDCP SN;
sending the message from a source base station to a target base station; and
performing a count maintenance at the target base station based upon at least a latest ciphering HFN and PDCP SN and latest deciphering HFN and PDCP SN by using a backward offset from a count value received by the target base station, the backward offset extending a time for expiration of a security key associated with at least one of the latest ciphering HFN and PDCP SN and the latest deciphering HFN and PDCP SN.

2. The method according to claim 1, wherein the source and target base stations are eNBs.

3. The method according to claim 1, wherein values of the HFN and PDCP SN are not reset at handoff.

4. The method according to claim 1, wherein a new key is generated at handoff.

5. The method according to claim 1, wherein key lifetime maintenance is transparent to a terminal in the wireless communication system.

6. The method of claim 1 in which the PDCP sequence numbers in the plurality of sequential counts are based on a value of a PDCP layer counter at the source base station.

7. The method of claim 6 in which the Hyper-Frame Numbers in the plurality of sequential counts are based on a state of the PDCP layer counter.

8. The method of claim 1 further comprising:
encrypting data based on the aggregate of the HFN and PDCP SN; and
sending the encrypted data to a user equipment.

9. The method of claim 1 in which the plurality of counts are configured to facilitate continuity of the HFN at the target base station.

10. The method of claim 1 in which the plurality of counts comprise a latest HFN and PDCP SN used for ciphering in the source base station.

11. The method of claim 1 in which the plurality of counts comprise a latest HFN and PDCP SN used for deciphering in the source base station.

12. An apparatus for synchronization between base stations during handoff in a Long Term Evolution (LTE) wireless communication system, the apparatus comprising:
at least one processor configured:
to generate a message comprising a plurality of sequential counts and a next packet data convergence protocol (PDCP) sequence number (SN) for handover continuity, each count comprising an aggregate of a Hyper-Frame Number (HFN) and a PDCP SN, and
to send the message from a source base station to a target base station;
a memory coupled with the processor, and
wherein a count maintenance is performed at the target base station based upon at least a latest ciphering HFN and PDCP SN and a latest deciphering HFN and PDCP SN by using a backward offset from a count value received by the target base station, the backward offset extending a time for expiration of a security key associated with at least one of the latest ciphering HFN and PDCP SN and the latest deciphering HFN and PDCP SN.

13. The apparatus according to claim 12, wherein the source and target base stations are eNBs.

14. The apparatus according to claim 12, wherein the HFN and PDCP values are not reset at handoff.

15. The apparatus according to claim 12, wherein a new key is generated at handoff.

16. The apparatus according to claim 12, wherein key lifetime maintenance is transparent to a terminal in the wireless communication system.

17. The apparatus of claim 12 in which the PDCP sequence numbers in the plurality of sequential counts are based on a value of a PDCP layer counter at the source base station.

18. The apparatus of claim 17 in which the Hyper-Frame Numbers in the plurality of sequential counts are based on a state of the PDCP layer counter.

19. The apparatus of claim 12 in which the at least one processor is further configured:
to encrypt data based on the aggregate of the HFN and the PDCP SN; and
to transmit the encrypted data to a user equipment.

20. The apparatus of claim 12 in which the plurality of counts are configured to facilitate continuity of the HFN at the target base station.

21. The apparatus of claim 12 in which the plurality of counts comprise a latest HFN and PDCP SN for ciphering in the source base station.

22. The apparatus of claim 12 in which the plurality of counts comprise a latest HFN and PDCP SN for deciphering in the source base station.

23. An apparatus used for synchronization between base stations during handoff in a Long Term Evolution (LTE) wireless communication system, the apparatus comprising:
means for generating a message comprising a plurality of sequential counts and a next packet data convergence protocol (PDCP) sequence number (SN) for handover continuity, each count comprising an aggregate of a Hyper-Frame Number (HFN) and a PDCP SN;
means for sending the message from a source base station to a target base station, and
means for performing a count maintenance based upon at least a latest ciphering HFN and PDCP SN and a latest deciphering HFN and PDCP SN by using a backward offset from a count value received by the target base station, the backward offset extending a time for expiration of a security key associated with at least one of the latest ciphering HFN and PDCP SN and the latest deciphering HFN and PDCP SN.

24. A non-transitory computer-readable medium comprising:
code to generate a message comprising a plurality of sequential counts and a next packet data convergence protocol (PDCP) sequence number (SN) for handover continuity, each count comprising an aggregate of a Hyper-Frame Number (HFN) and a PDCP SN;
code to send the message from a source base station to a target base station, and
code for performing a count maintenance based upon at least a latest ciphering HFN and PDCP SN and a latest deciphering HFN and PDCP SN by using a backward offset from a count value received by the target base station, the backward offset extending a time for expiration of a security key associated with at least one of the latest ciphering HFN and PDCP SN and the latest deciphering HFN and PDCP SN.

25. The non-transitory computer readable medium according to claim 24, further comprising code to avoid reset of the HFN and PDCP sequence number at handoff.

26. A method of synchronization at a target base station in a Long Term Evolution (LTE) wireless communication system, the method comprising:
receiving a message from a source base station comprising a plurality of sequential counts and a next packet data convergence protocol (PDCP) sequence number (SN) for handover continuity, each count comprising an aggregate of a latest Hyper-Frame Number (HFN) and a PDCP SN; and
performing a count maintenance at the target base station based upon at least a latest ciphering HFN and PDCP SN and latest deciphering HFN and PDCP SN by applying a backward offset to the count, the backward offset extending a time for expiration of a security key associated with at least one of the latest ciphering HFN and PDCP SN and the latest deciphering HFN and PDCP SN.

27. The method of claim 26, further comprising using a next value of the count to encrypt data for transmission to a user equipment.

28. The method of claim 26, wherein the count maintenance is performed after a handover of a user equipment from the source base station to the target base station.

29. The method of claim 26, further comprising performing the count maintenance when the count reaches a threshold value.

30. The method of claim 26, further comprising triggering expiration of the security key at the target base station when the count reach the threshold value.

31. The method of claim 26, wherein the backward offset is relative to a point at which a user equipment is handed over from the source base station.

32. An apparatus operative as a target base station in a Long Term Evolution (LTE) wireless communication system, comprising:
at least one processor configured:
to receive a message from a source base station comprising a plurality of sequential counts and a next packet data convergence protocol (PDCP) sequence number (SN) for handover continuity, each count comprising an aggregate of a latest Hyper-Frame Number (HFN) and PDCP SN, and
to perform a count maintenance at the target base station based upon at least a latest ciphering HFN and PDCP SN and latest deciphering HFN and PDCP SN by applying a backward offset to the count, the backward offset extending a time for expiration of a security key associated with at least one of the latest ciphering HFN and PDCP SN and the latest deciphering HFN and PDCP SN; and
a memory coupled to the processor.

33. The apparatus of claim 32, wherein the processor is further configured to use a next value of the count to encrypt data for transmission to a user equipment.

34. The apparatus of claim 32, wherein the count maintenance is performed after handover of a user equipment from the source base station to the target base station.

35. The apparatus of claim 32, wherein the processor is further configured to perform the count maintenance when the count reaches a threshold value.

36. The apparatus of claim 32, wherein the processor is further configured to trigger expiration of the security key at the target base station when the count reaches the threshold value.

37. The apparatus of claim 32, wherein the backward offset is relative to a point at which a user equipment is handed over from the source base station.

* * * * *